Dec. 3, 1929. L. M. PERSONS 1,738,201
STARTING CLUTCH FOR MOTORS
Filed March 30, 1929 2 Sheets-Sheet 1
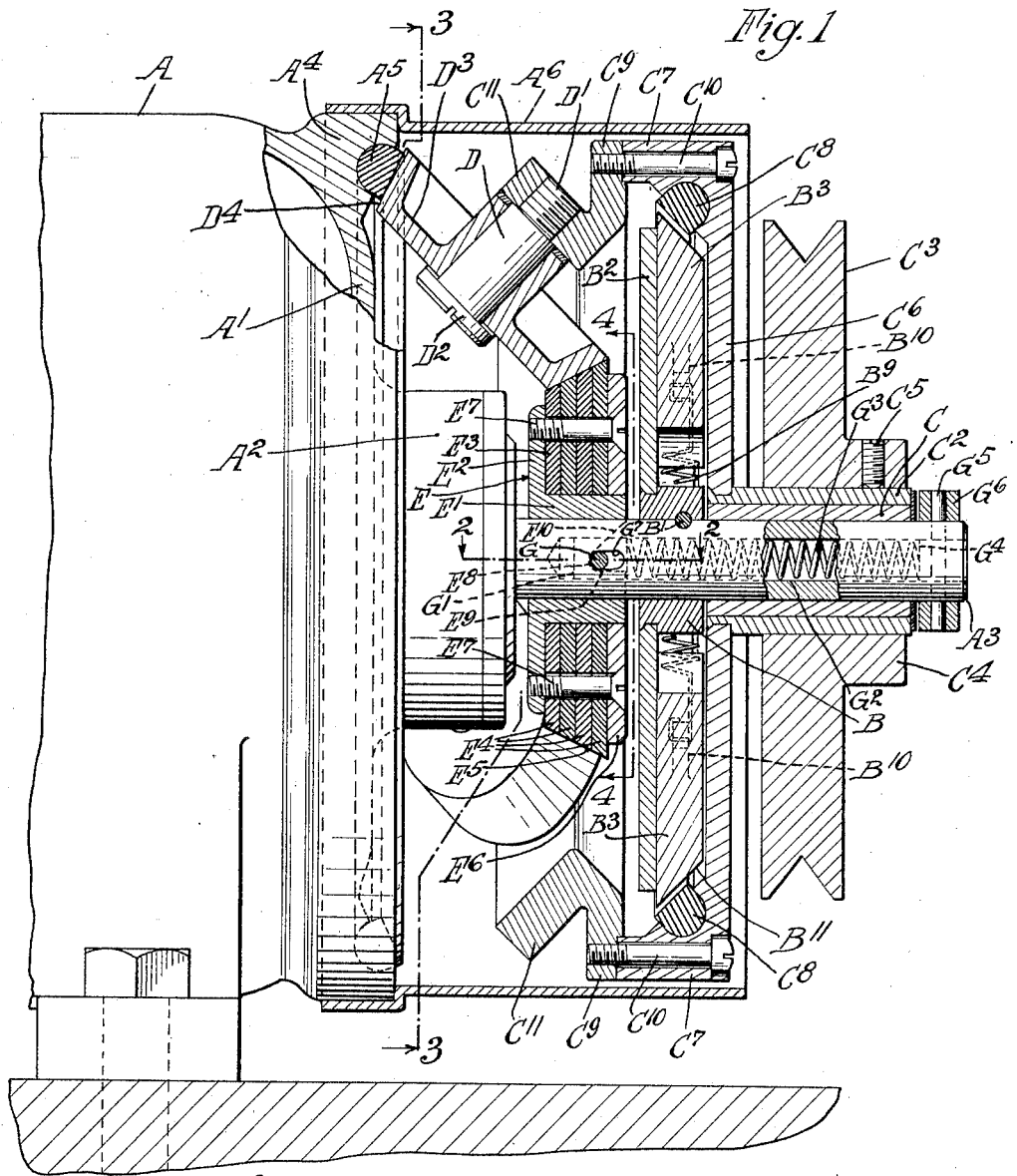
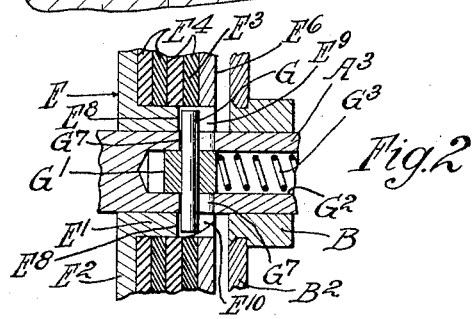
Inventor
Laurence M. Persons
by Parker & Carter
Attorneys.

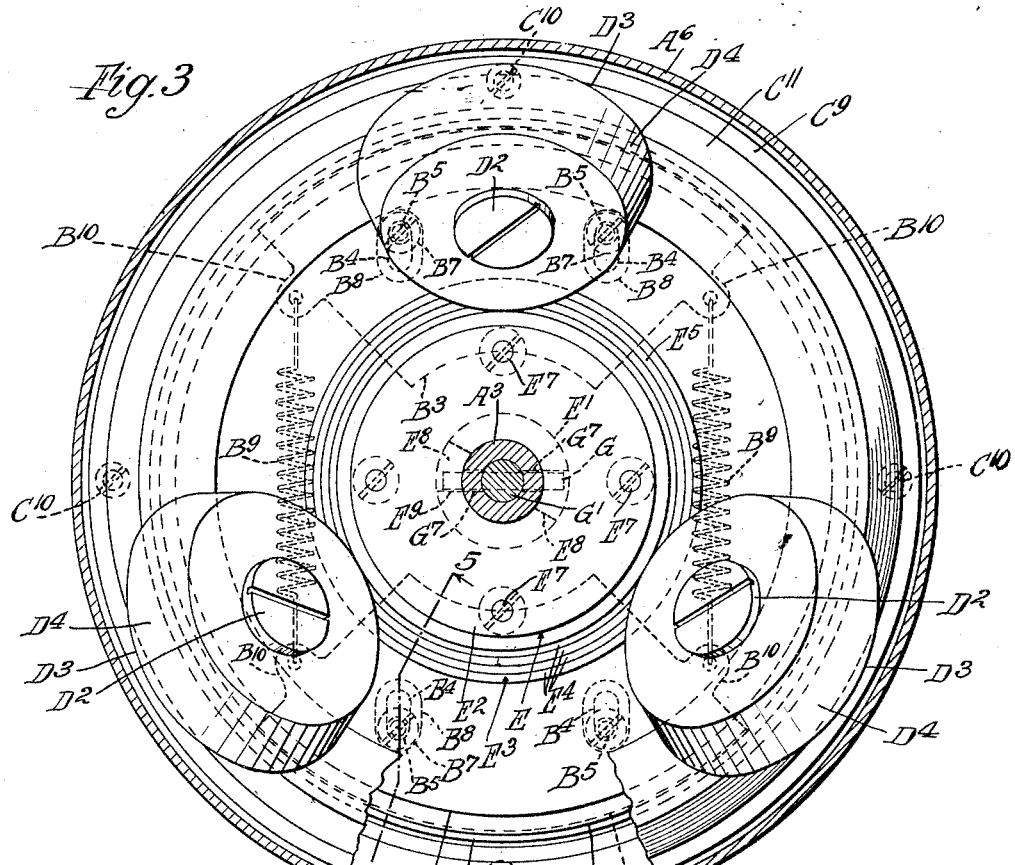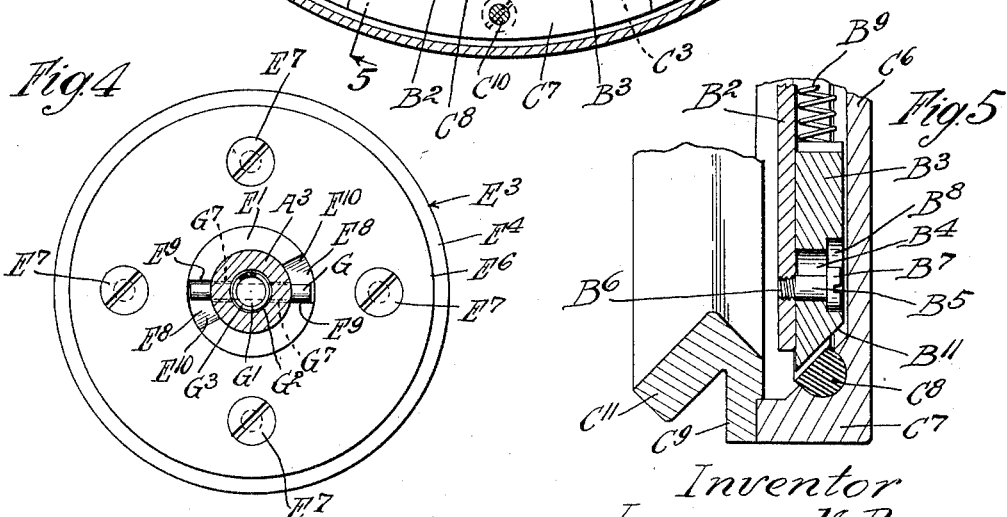

Patented Dec. 3, 1929

1,738,201

UNITED STATES PATENT OFFICE

LAURENCE M. PERSONS, OF ST. LOUIS, MISSOURI, ASSIGNOR TO EMERSON ELECTRIC MANUFACTURING CO., OF CHICAGO, ILLINOIS, A CORPORATION OF MISSOURI

STARTING CLUTCH FOR MOTORS

Application filed March 30, 1929. Serial No. 351,319.

My invention relates to a starting clutch for motors and has for particular purpose the provision of a starting clutch or starting means for an induction motor. One object is to provide an automatic starting clutch and gearing for initiating the rotation of such a motor for the purpose of obtaining a high starting torque with a low amperage. Another object is the provision of such starting means which shall be effective at the starting of the motor but which shall be entirely withdrawn from operation after the rotor of the motor approaches normal speeds of rotation. Another object is the provision of a starting clutch which shall be noiseless and which shall have a maximum life or wear. Other objects will appear from time to time in the course of the specification and claims.

I illustrate my invention more or less diagrammatically in the accompanying drawing, wherein—

Figure 1 is an axial section;

Figure 2 is a section on the line 2—2 of Figure 1;

Figure 3 is a section on the line 3—3 of Figure 1;

Figure 4 is a section on the line 4—4 of Figure 1; and

Figure 5 is a section on the line 5—5 of Figure 3.

Like parts are indicated by like symbols throughout the specification and drawings.

Referring for example to Figure 1 A generally indicates any suitable motor housing within which is contained, although not shown in detail, the rotor of any suitable induction motor. The housing is shown as having an end wall $A^1$, a centrally disposed portion $A^2$ which may enclose any suitable bearing member for the stub shaft $A^3$ of the motor. $A^4$ indicates an abutment flange formed at the end of the housing A, and having inset therein a frictional member or ring $A^5$. $A^6$ indicates any suitable protecting flange or sleeve extending axially outwardly about the gearing elsewhere herein described. It is indicated as separate from the housing A but if desired it may be formed integral with it.

Fixed upon the stub shaft $A^3$ and held against rotation in relation thereto is the hub member B which may be pinned in position as by the pin $B^1$. Mounted upon this hub member is the disc $B^2$. Mounted for centrifugal movement in relation to said disc are the centrifugal shoes $B^3$ shown in side elevation in Figure 3 and in section in Figures 3 and 5. The shoes are indicated as segments containing the slots $B^4$ through which pass the screws $B^5$ screwed into the disc $B^2$ as at $B^6$. The head $B^7$ of these screws set in enlargements $B^8$ of the slots $B^4$. The slots being formed and positioned as shown in Figure 3, it will be understood that the shoes $B^3$ are constrained to outward movement, in response to the rotation of the disc $B^2$ in opposite directions from the center of rotation. They are normally constrained to inward position, for example by the springs $B^9$, each spring being secured at one end to an abutment $B^{10}$, at one of the segments or shoes. In the structure as shown the shoes are constrained to inward position when the disc is not rotating, but may be moved to outward position in response to rotation of the disc. Note that the shoes at their outer extension terminate in inclined surfaces $B^{11}$.

Surrounding the end of the stub shaft $A^3$ outwardly beyond the hub B is the bearing bushing C. Positioned about said bushing is the sleeve $C^2$ about which is mounted the pulley $C^3$ with its extension or hub $C^4$. $C^5$ indicates any suitable securing means for preventing rotation of the pulley $C^3$. $C^6$ indicates a disc secured against rotation in relation to the sleeve $C^2$ and provided about its periphery with a lateral extension $C^7$ in which may be inset the frictional member $C^8$ adapted to be opposed to the inclined surfaces $B^{11}$ of the shoes or segments $B^3$. Further secured to the portion $C^7$ is the ring $C^9$ which may be connected to it for example by the screws or bolts $C^{10}$. It is provided with a further extension generally indicated as $C^{11}$. This further extension $C^{11}$ is indicated as inclined from perpendicularity to the axis of rotation of the motor.

Mounted upon it are a plurality of stub shafts D herein shown as three in number and screwthreaded into the ring or extension $C^{11}$ as at $D^1$. The heads $D^2$ of each member D serve to constrain against axial movement the frictional driving rollers $D^3$, each such roller having the inclined peripheral bearing surface $D^4$.

Mounted for rotation with the shaft $A^3$ is the friction gear or member generally indicated as E and including the hub $E^1$ the flange $E^2$ projecting therefrom and the friction member proper $E^3$ which may be formed of a plurality of sheets $E^4$ of any suitable friction material, for example of fibrous material. This friction material terminates in the inclined or beveled circumferential bearing surface $E^5$. $E^6$ indicates any suitable clamping member which may be held against these strips as by the screw $E^7$, the layers being thereby clamped between the member $E^6$ and the flange $E^2$. The hub member $E^1$ is provided with a plurality of cam surfaces herein indicated as diametrically opposed cut away portions $E^8$ having one straight face $E^9$ and the inclined cam face $E^{10}$. But one of these cam members is shown in Figure 1 and it will be understood that the second one is diametrically opposed thereto and if it appeared on the drawing would show an inclination in the opposite direction, whereby the two cam surfaces have a unitary action. These cam surfaces are adapted to be engaged by the extending ends of a pin G mounted in a block $G^1$ slidable within the axial aperture $G^2$ of the shaft $A^3$. The block $G^1$ and the pin G are normally urged to the left, as shown in Figure 1, as by the spring $G^3$ which is compressed between the block $G^1$ and the block $G^4$ which is pinned by the pin $G^5$ passing through the securing terminal sleeve $G^6$ of the shaft. The sleeve $G^6$ has the additional function of serving as a stop to limit the outward movement of the sleeve $C^2$ with the pulley $C^3$. $G^7$ are slots in the shaft $A^3$ in which the pin G slides.

It will be realized that whereas I have described and shown a practical and operative device, nevertheless many changes may be made in size, shape, number and disposition of parts without departing from the spirit of my invention. I wish my drawings to be taken as in a broad sense illustrative and diagrammatic rather than as limiting me to the specific details of drive, gearing and the like.

The use and operation of my invention are as follows:

In the normal operation of the device herein shown I provide a mechanical substitute for obtaining, with the use of a split phase induction motor, the characteristics of a plane induction motor. I am able to start such a motor at a minimum amperage and obtain a satisfactory starting torque. As soon as the rotor comes up to speed, the starting means is cut out and the motor directly drives the driven member, pulley or the like.

Referring for example to the structure described and shown herein, when rotation of the rotor and shaft $A^3$ is initiated the initial rotation of the shaft $A^3$ moves the pin G against the cam surfaces $E^{10}$ and urges the friction member generally indicated as E, to the left, as shown in Figure 1. Its beveled surface $E^5$ is thereby thrust into engagement with the bevel surfaces $D^4$ of the rollers $D^3$ and these surfaces also engage the opposed frictional surface or member $A^5$. The effect of the rotation is to move the entire assembly including the disc $C^6$ to the left toward the motor housing, thus causing the motor to drive through the planetary gear thereby provided at any suitable reduction, for example at a reduction of three to one. As the rotor comes up to speed the weights or shoes $B^3$ are centrifugally moved outwardly until their bevel or inclined surfaces $B^{11}$ engage the frictional members $C^8$ mounted on the disc $C^6$. The result is to obtain a direct drive from the shaft $A^3$, since the shaft is secured to the hub B, the weights $B^3$ rotate with the hub B, and by their connection with the frictional member $C^8$ directly drive the disc $C^6$ and through it the sleeve $C^2$ and the pulley $C^3$.

Further, as the weights are centrifugally moved and engage the opposed member $C^8$ the inclination of the opposed engaging surfaces tend to move the assembly which includes the disc $C^6$ to the right, referring to Figure 1. This tends to disengage the frictional driving members $D^3$ from the fixed frictional member $A^5$, thereby terminating the planetary drive. As the planetary assembly is withdrawn from contact with the frictional member $A^5$ the frictional member generally indicated as E assumes its original position, the pin dropping back to its initial location in relation to the cam members $E^{10}$ and the planetary driving unit rotates as an idle part of the driving unit. In other words once the motor is rotating at speeds approaching its normal R. P. M., there is no rotation of the driving members $D^3$ about the pins D, and no relative movement of the frictional member E in relation to the drive members $D^3$.

It can therefore be seen that not only have I provided an initial driving or starting connection which permits a satisfactory starting torque at minimum amperage but I have provided such a connection which is in movement only during the actual starting interval. Inasmuch as it is not in movement during normal operation of the motor, except as it rotates with the rotor as a whole, wear is reduced to a minimum and the life of the moving member is prolonged. Furthermore the employment of the inclined surfaces as at $B^{11}$ provides a wedging or tightening effect which clamps the members fixed and prevents rattle and consequent wear. The starting device is thus silent, as well as efficient and undesired relative movement of the parts during operation is prevented.

In normal operation the inside or stub shaft $A^3$, when the motor has reached a predetermined minimum speed, rotates in relation to the outer shaft in ratio determined by the planetary gear reduction. By this method a starting torque of four times the normal torque of the motor is provided up to four or five hundred R. P. M. Beyond this speed a full load torque of the motor is provided up to the full load speed.

I claim:

1. For use with an electric motor, a frictional starting clutch including a frictional driving gear adapted to be driven by a motor shaft, a driven member free to rotate in relation to said motor shaft, planetary friction gears associated with said driven member and adapted for engagement with said frictional driving gear, a fixed frictional member associated with the motor and adapted to be engaged by the planetary gears, means responsive to the initial rotation of the motor shaft for moving the frictional driving gear and planetary members into operative driving position and means effective after the initiation of rotation for withdrawing the planetary members from contact with the fixed frictional member.

2. The combination with an electric motor of a starting clutch which includes a fixed gear member, a rotary gear member and a plurality of intermediate planetary gears, and means for withdrawing said rotary gear member and planetary gears from said fixed member in response to rotation of the motor.

3. The combination with an electric motor of a starting clutch which includes a fixed gear member, a rotary gear member and a plurality of intermediate planetary gears, and means for withdrawing said rotary gear member and planetary gears from said fixed member in response to rotation of the motor, including a centrifugal member associated with the motor shaft and mounted for movement in a plane substantially perpendicular to the axis of rotation of said shaft, said member being provided with a wedging surface operative to withdraw the rotary and planetary gears.

4. The combination with an electric motor of a starting clutch which includes a fixed gear member, a rotary gear member and a plurality of intermediate planetary gears, and means for withdrawing said rotary gear member and planetary gears from said fixed member in response to rotation of the motor, including a centrifugal member associated with the motor shaft and mounted for movement in a plane substantially perpendicular to the axis of rotation of said shaft, said centrifugal member being provided with a cam or wedging face, and a supporting member for the intermediate planetary gears, said supporting member having a portion opposed to said cam face, and in the plane of centrifugal movement of said centrifugal member.

5. The combination with an electric motor of a starting clutch which includes a fixed gear member, a rotary gear member, an intermediate planetary gear adapted for operative engagement with said fixed and said rotary gear members, and centrifugally operable means for withdrawing said rotary gear member and said planetary gear from operative association with said fixed gear member, in response to rotation of the motor.

6. The combination with an electric motor of a starting clutch which includes a fixed gear member, a rotary gear member, an intermediate planetary gear adapted for operative engagement with said fixed and said rotary gear members and supporting means therefor, and centrifugally operable means for withdrawing said rotary gear member and said planetary gear from operative association with said fixed gear member, in response to rotation of the motor, including a centrifugal weight adapted to exert an outwardly wedging action upon said planetary gear supporting means.

7. The combination with an electric motor of a starting clutch which includes a fixed gear member, a rotary gear member, an intermediate planetary gear adapted for operative engagement with said fixed and said rotary gear members, and centrifugally operable means for withdrawing said rotary gear member and said planetary gear from operative association with said fixed gear member, in response to rotation of the motor, and independently operable means for withdrawing said rotary gear member axially away from said fixed gear member.

8. The combination with an electric motor of a starting clutch which includes a fixed gear member, a rotary gear member, an intermediate planetary gear adapted for operative engagement with said fixed and said rotary gear members, and centrifugally operable means for withdrawing said rotary gear member and said planetary gear from operative association with said fixed gear member, in response to rotation of the motor, and independently operable means for withdrawing said rotary gear member axially away from said fixed gear member, including a cam member interposed between the rotary gear member and the shaft of the electric motor and a cam engaging member associated with the shaft.

9. The combination with an electric motor and motor shaft of a starting clutch which includes a fixed gear member, a rotary gear member about said shaft, an intermediate planetary gear adapted for operative engagement with said fixed rotary gear members and means for withdrawing said rotary gear member and intermediate planetary gear from operative association with said fixed gear member, including a cam member associated with said rotary gear member and a cam engaging member associated with said shaft and held against rotation in relation thereto, the rotary gear member being rotatable in relation to said motor shaft through an arc sufficient to permit a caming action therebetween.

10. The structure of claim 9 characterized in that the cam engaging member is longitudinally movable along the motor shaft.

11. The structure of claim 9 characterized in that the cam engaging member is longitudinally movable along the motor shaft, and by the provision of yielding means tending normally to move the cam engaging member into contact with the opposed cam member.

12. For use with an electric motor, a frictional starting clutch including a frictional driving gear adapted to be driven by a motor shaft, a driven member free to rotate in relation to said motor shaft, planetary friction gears associated with said driven member and adapted for engagement with said frictional driving gear, a fixed frictional member associated with the motor and adapted to be engaged by the planetary gears, means responsive to the initial rotation of the motor shaft for moving the frictional driving gear and planetary members into operaitve driving position and means effective after the initiation of rotation for withdrawing the planetary members from contact with the fixed frictional member, including a centrifugal member held against rotation in relation to the motor shaft but movable radially, said centrifugal member being provided with a wedging surface adapted to engage an opposed surface upon the driven member and to exert a wedging action thereagainst whereby the planetary members are withdrawn from contact with the fixed frictional member.

Signed at St. Louis, State of Missouri, this 21st day of March, 1929.

LAURENCE M. PERSONS.